United States Patent
Sullivan et al.

(10) Patent No.: US 6,796,192 B2
(45) Date of Patent: Sep. 28, 2004

(54) PASS THROUGH SEAT RESTRAINT TENSION SENSING ASSEMBLY

(75) Inventors: Stuart S. Sullivan, Peru, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 230 days.

(21) Appl. No.: 10/025,315

(22) Filed: Dec. 19, 2001

(65) Prior Publication Data

US 2003/0111835 A1 Jun. 19, 2003

(51) Int. Cl.$^7$ ................................................ G01L 1/26
(52) U.S. Cl. .............................................. 73/862.391
(58) Field of Search ........................ 73/826, 827, 828, 73/862.391, 862.451, 862.453, 153, 159, 160

(56) References Cited

U.S. PATENT DOCUMENTS

| | | | |
|---|---|---|---|
| 5,823,627 A | 10/1998 | Viano et al. | |
| 6,151,540 A | 11/2000 | Anishetty | |
| 6,205,868 B1 | 3/2001 | Miller | |
| 6,230,088 B1 | 5/2001 | Husby | |
| 6,336,371 B1 | 1/2002 | O'Boyle | |
| 6,340,176 B1 | 1/2002 | Webber et al. | |
| 6,400,145 B1 | 6/2002 | Chamings et al. | |
| 6,454,304 B1 | 9/2002 | Steffens, Jr. | |
| 6,502,860 B1 | 1/2003 | Siegfried et al. | |
| 6,508,114 B2 * | 1/2003 | Lawson | 73/159 |
| 6,520,540 B1 | 2/2003 | Siegfried et al. | |
| 6,554,318 B2 | 4/2003 | Kohut et al. | |
| 6,572,147 B2 | 6/2003 | Webber et al. | |
| 6,605,877 B1 | 8/2003 | Patterson et al. | |
| 2002/0104383 A1 | 8/2002 | Chamings et al. | |
| 2003/0024326 A1 | 2/2003 | Blakesley et al. | |

* cited by examiner

*Primary Examiner*—Max Noori
(74) *Attorney, Agent, or Firm*—Scott A. McBain

(57) ABSTRACT

A pass through seat restraint tension sensing assembly for a seat restraint system in a vehicle includes a housing for allowing belt webbing of the seat restraint system to pass therethrough. The pass through seat restraint tension sensing assembly also includes at least one spring disposed in the housing and at least one magnet disposed in the housing. The pass through seat restraint tension sensing assembly includes a Hall effect sensor disposed in the housing and cooperable with the at least one magnet. The pass through seat restraint tension sensing assembly further includes a movable actuator disposed in the housing and cooperable with the belt webbing and the at least one spring to move the at least one magnet relative to the Hall effect sensor to indicate a tension level in the seat restraint system.

18 Claims, 2 Drawing Sheets

PASS THROUGH SEAT RESTRAINT TENSION SENSING ASSEMBLY

TECHNICAL FIELD

The present invention relates generally to seat restraint systems for vehicles and, more particularly, to a pass through seat restraint tension sensing assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Smart inflatable restraint systems need to know what is occupying a seat of the vehicle. Decisions on deployment of inflatable restraints depend on information supplied by sensors in the seat in determining weight of an object in the seat. When a child seat is placed in the seat and cinched down, the sensors may read a large mass instead of a child seat. With this condition, however, there will be high tension in the seat restraint system. Comfort studies have shown that no human occupant would wear their seat restraint that tight. With this information on seat restraint tension, the inflatable restraint system can decide on deployment of the inflatable restraint.

Therefore, it is desirable to provide a pass through seat restraint assembly for sensing tension in a seat restraint system of a vehicle. It is also desirable to provide an assembly for a seat restraint to pass through for a seat restraint system in a vehicle that allows a control module to determine the difference between either a child seat and a small occupant. It is further desirable to provide an assembly for a seat restraint to pass through for a seat restraint system in a vehicle that provides information used in determining inflatable restraint deployment levels.

SUMMARY OF THE INVENTION

It is, therefore, one object of the present invention to provide for pass through seat restraint tension sensing in a seat restraint system of a vehicle.

It is another object of the present invention to provide a Hall effect sensor and balanced force for pass through seat restraint tension sensing in a seat restraint system of a vehicle.

To achieve the foregoing objects, the present invention is a pass through seat restraint tension sensing assembly for a seat restraint system in a vehicle including a housing for allowing seat belt webbing of the seat restraint system to pass therethrough. The pass through seat restraint tension sensing assembly also includes at least one spring disposed in the housing and at least one magnet disposed in the housing. The pass through seat restraint tension sensing assembly includes a Hall effect sensor disposed in the housing and cooperable with the at least one magnet. The pass through seat restraint tension sensing assembly further includes a movable actuator disposed in the housing and cooperable with the belt webbing and the at least one spring to move the at least one magnet relative to the Hall effect sensor to indicate a tension level in the seat restraint system.

One advantage of the present invention is that a pass through seat restraint tension sensing assembly is provided for a seat restraint system in a vehicle. Another advantage of the present invention is that the pass through seat restraint tension sensing assembly senses tension in the seat restraint system to help identify what is occupying the seat, either a child, child seat, or low mass adult. Yet another advantage of the present invention is that the pass through seat restraint tension sensing assembly has Hall effect sensors in a push—push arrangement to maximize the output of the Hall effect sensors. Still another advantage of the present invention is that the pass through seat restraint tension sensing assembly employs two springs that are displaced one half the distance from center and one spring on the other side of center for maximum balance force with three springs to balance out-of-plane loading. A further advantage of the present invention is that the pass through seat restraint tension sensing assembly passes the force through at high loads and does not carry the load, resulting in the assembly not being directly in the tension path at very high loads. Yet a further advantage of the present invention is that the pass through seat restraint tension sensing assembly has a balanced force relationship provided by offset springs that prevents internal tipping of an actuator. Still a further advantage of the present invention is that the pass through seat restraint tension sensing assembly has springs that require 1/10 the force to generate the maximum load and are out of the load path at the maximum load (5000 lb). Another advantage of the present invention is that the pass through seat restraint tension sensing assembly is universal because it utilizes common dimensions such as width and thickness of all seat belt restraints, can be formulated from light weight and plastic components, and is relatively low cost. Another advantage of the present invention is that the pass through seat restraint tension sensing assembly has a force/deflection relationship that is non-linear and allows more resolution at lower forces and does not rattle, but provides low tension output.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
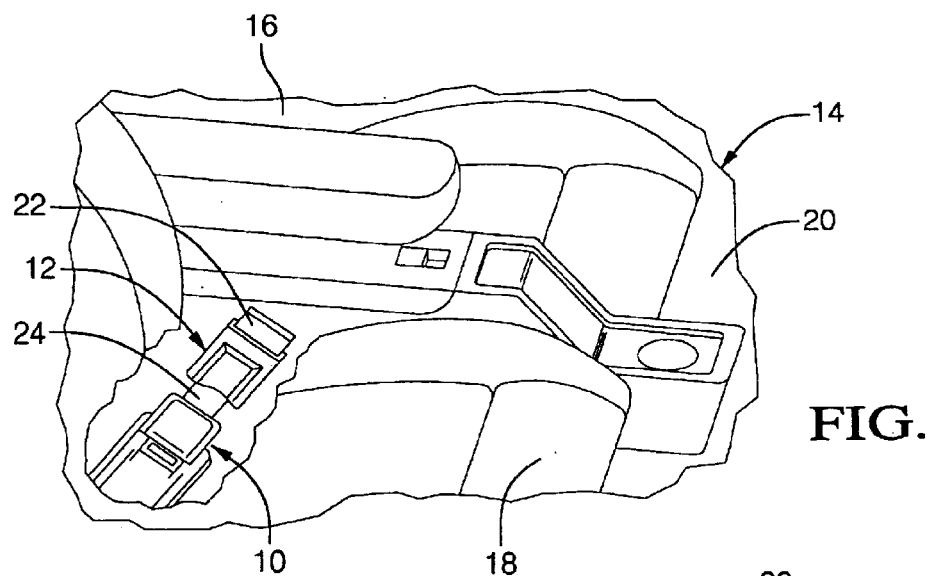
FIG. 1 is a perspective view of a pass through seat restraint tension sensing assembly, according to the present invention, illustrated in operational relationship with a seat restraint system of a vehicle.

Referring to the drawings and in particular FIG. 1, one embodiment of a pass through seat restraint tension sensing assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure (not shown) such as a floorpan in an occupant compartment 20 of the vehicle body 16. In this embodiment, the seat 18 is a front seat of the vehicle 14. It should be appreciated that the seat 18 could be a rear, second row, or third row seat for the vehicle 14.

Figure 2:
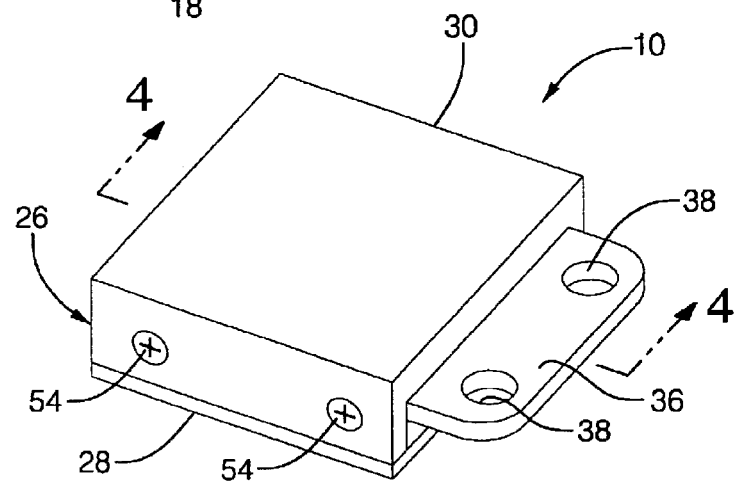
FIG. 2 is a perspective view of the pass through seat restraint tension sensing assembly of FIG. 1 illustrated without the seat restraint.

Referring to FIGS. 1 and 2, the vehicle 14 includes the seat restraint system 12 for restraining an occupant (not shown) in the seat 18. The seat restraint system 12 includes a latch tongue or plate (not shown) connected to an end of either one of a lap belt, shoulder belt, or both (not shown) which have another end connected to a retractor (not shown). The seat restraint system 12 also includes a buckle assembly 22 and the pass through seat restraint tension sensing assembly 10 connected by suitable means such as belt webbing 24 to vehicle structure. The belt webbing 24 passes through the pass through seat restraint tension sensing assembly 10 in a manner to be described. It should be appreciated that the latch plate is engageable and disengageable with the buckle assembly 22. It should also be appreciated that, except for the pass through seat restraint tension sensing assembly 10, the seat restraint system 12 and vehicle 14 are conventional and known in the art.

Figure 3:
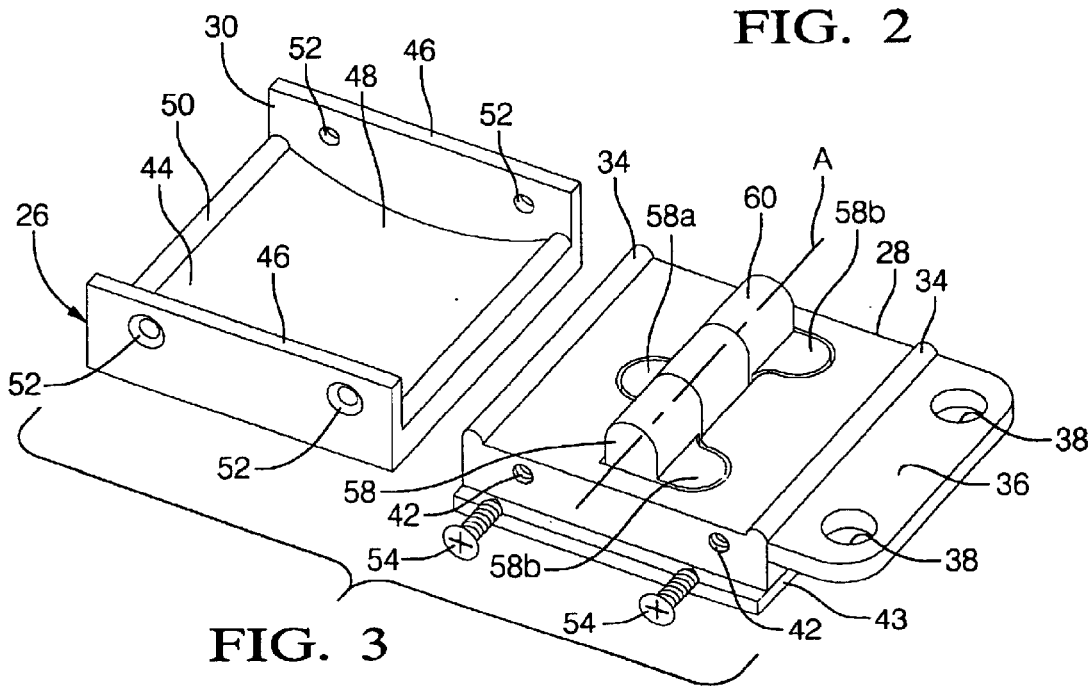
FIG. 3 is an exploded perspective view of the pass through seat restraint tension sensing assembly of FIG. 1 illustrated without the seat restraint.
Figure 4:
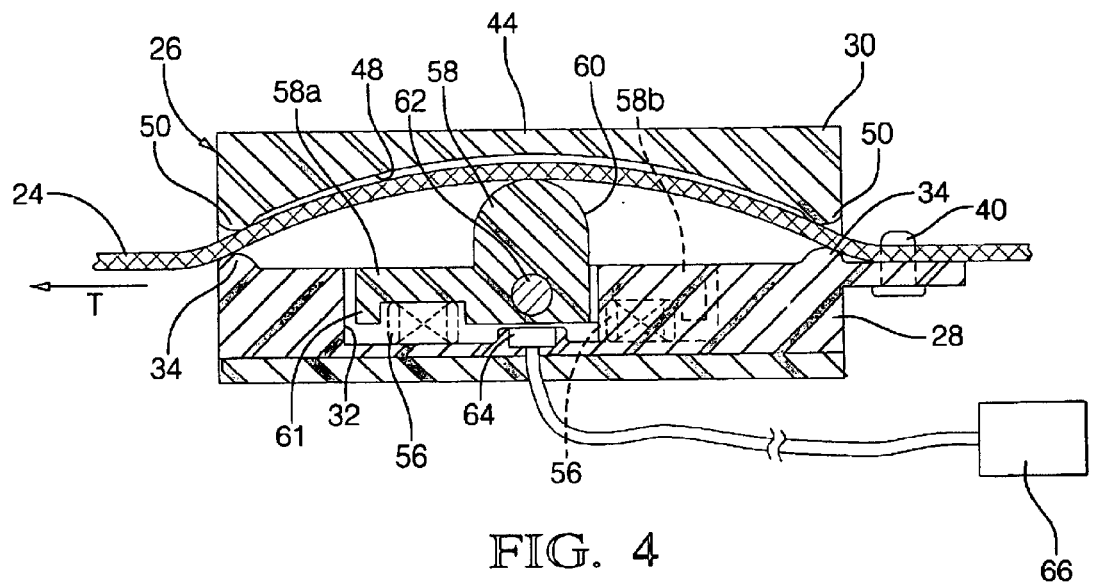
FIG. 4 is a sectional view taken along line 44 of FIG. 2.

Referring to FIGS. 2 through 4, the pass through seat restraint tension sensing assembly 10, according to the present invention, includes a housing, generally indicated at 26, to allow the belt webbing 24 to pass therethrough. The housing 26 includes a lower housing member 28 and an upper housing member 30 cooperating with the upper housing member 28. The lower housing member 28 is generally rectangular in shape. The lower housing member 28 has a cavity 32 extending downwardly and laterally therein. The lower housing member 28 has a projection 34 at each longitudinal end extending upwardly and laterally. The projection 34 has a generally arcuate cross-sectional shape for a function to be described. The lower housing member 28 also has a flange 36 at one longitudinal end extending longitudinally and laterally. The flange 36 has at least one, preferably a plurality of apertures 38 extending therethrough to receive fasteners 40 such as rivets to fix the lower housing member 28 to the belt webbing 24. The lower housing member 28 also includes at least one, preferably a plurality of apertures 42 spaced longitudinally along each side and extending laterally therein. The lower housing member 28 may have a flange or separate plate 43 attached to the lower housing member 28 by suitable means such as fasteners (not shown) or integral and one-piece therewith extending outwardly for a function to be described. The lower housing member 28 is made of a rigid lightweight material such as plastic. It should be appreciated that the fasteners 40 are conventional and known in the art. It should also be appreciated that the fasteners 40 are optional and the pass through seat restraint tension sensing assembly 10 could be used with continuous belt webbing feed.

The upper housing member 30 is generally rectangular in shape. The upper housing member 30 has a base wall 44 and a pair of side walls 46 spaced laterally and extending longitudinally and generally perpendicular to form a cavity 48 therein. The base wall 44 may be generally arcuate in shape. The upper housing member 30 also has a projection 50 at each longitudinal end extending downwardly and laterally from the base wall 44. The projection 50 has a generally arcuate cross-sectional shape for a function to be described. The upper housing member 30 further includes at least one, preferably, a plurality of apertures 52 spaced longitudinally along each side wall 46 and extending laterally therethrough to receive fasteners 54 such as screws that threadably engage the apertures 42 in the lower housing member 28 to fix or secure the upper housing member 30 to the lower housing member 28. The upper housing member 30 is made of a rigid lightweight material such as plastic. It should be appreciated that the side walls 46 overlap the sides of the lower housing member 28 and are flush with the flange 43. It should also be appreciated that the belt webbing 24 passes through the housing 26 between the lower housing member 28 and the upper housing member 30 as illustrated in FIG. 4.

The pass through seat restraint tension sensing assembly 10 includes at least one, preferably a plurality of, more preferably, three springs 56 disposed in the cavity 32 of the lower housing member 28. The springs 56 are of a leaf type. The springs 56 are arranged such that two springs 56 are one half the distance from a third spring 56 to provide balance. In other words, two springs 56 are located longitudinally one half the distance from a center axis A and one spring 56 is located longitudinally the distance on the other side of the center axis for maximum balance force with three springs 56 to balance out-of-plane loading. The springs 56 cooperate with an actuator 58 to be described. The springs 56 are made of a spring material. The springs 56 are tuned to a predetermined force such as for comfort or low tension in the seat restraint system 12. The springs 56 may also be of a coil spring type. It should be appreciated that, although more springs 56 can be used to provide this force balance, three springs 56 provide the minimal number of springs 56 and still maintain to center a location for a Hall effect sensor 64 to be described. It should also be appreciated that two springs 56 may be used with equi-distant spring locations. It should further be appreciated that the springs 56 are arranged in an offset pattern to prevent internal tipping of the actuator 58 to be described.

The pass through seat restraint tension sensing assembly 10 includes a movable actuator 58 disposed in the cavity 32 of the lower housing member 28 for cooperating with the springs 56. The actuator 58 is generally rectangular in shape and extends laterally. The actuator 58 has a first flat or planar portion 58a to cooperate with one spring 56 and a second flat or planar portion 58b to cooperate with the other two springs 56. The actuator 58 has an upper surface 60 having a generally arcuate shape to contact the belt webbing 24. The actuator 58 may have an extension 61 extending downwardly from the first and second flat portions 58a and 58b to contain the springs 56. The actuator 58 is made of a rigid lightweight material such as plastic. It should be appreciated that, as the tension is increased in the belt webbing, the contact force of the actuator 58 increases. It should also be appreciated that actuator 58 moves as the springs 56 are deflected.

The pass through seat restraint tension sensing assembly 10 includes at least one, preferably a plurality of, more preferably, two magnets 62 are disposed in the cavity 32 of the lower housing member 28. The magnets 62 are mounted on the actuator 58, preferably molded into the actuator 58, and spaced laterally. The pass through seat restraint tension sensing assembly 10 includes a Hall effect sensor 64 disposed in the cavity 32 in the lower housing member 28. The Hall effect sensor 64 is spaced laterally between and disposed underneath the magnets 62 in a low tension condition. The magnets 62 are moved by the actuator 58 to be disposed on both sides of the Hall effect sensor 64 during a high tension condition. It should be appreciated that the actuator 58 moves as the springs 56 are deflected and this motion moves the magnets 62 closer to the Hall effect sensor 64 in a push—push arrangement. It should also be appreciated that the position of the magnets 62 relative to the Hall effect sensors 64 changes the output current of the Hall effect sensors 64. It should further be appreciated that the Hall effect sensor 64 may be mounted on a circuit board (not shown) connected to the lower housing member 28 and are potted and connected by electrical leads or wires to the source of power such as a controller 66 of the vehicle.

In operation of the pass through seat restraint tension sensing assembly 10, the occupant buckles the seat restraint system 12 and the tension in the belt webbing 24 is lower than a predetermined load required to deflect the springs 56 as illustrated in FIG. 4. In this state, the pass through seat restraint tension sensing assembly 10 will either send no signal or an open signal to the controller, causing the controller to determine that a normal or large mass adult is present in the seat 18. It should be appreciated that the actuator 58 of the pass through seat restraint tension sensing assembly 10 is spring loaded to an initial position by the springs 56.

Figure 5:
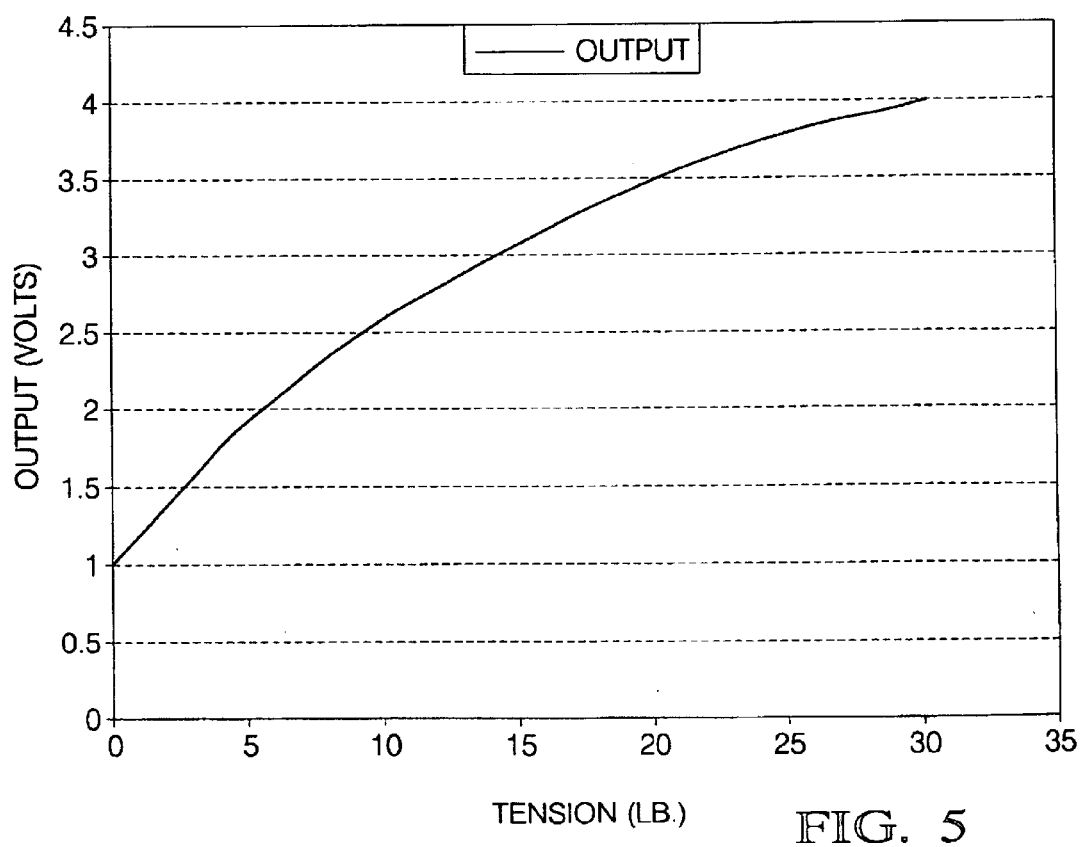
FIG. 5 is a graph of tension versus output for the pass through seat restraint tension sensing assembly of FIG. 1.

When a child seat (not shown) is placed in the seat 18 and the seat restraint system 12 is buckled, the belt webbing 24 is cinched to pull the child set tightly into the seat 18. As the tension is increased in the belt webbing 24, the contact force on the actuator 58 increases. The resistive force of the springs 56 reacts against the increased tension. When the tension in the belt webbing 24 exceeds the predetermined load, the actuator 58 moves as the springs 56 are deflected, thereby moving the magnets 62 closer to the Hall effect sensor 64 in a push—push arrangement. This movement changes the output of the Hall effect sensor 64 as illustrated in FIG. 5, causing the controller 66 to determine that a child seat is present in the seat 18. It should be appreciated that, at very high loads or high tension in the seat restraint system 12, the belt webbing 24 straightens, limiting the maximum force seen by the pass through seat restraint tension sensing assembly 10. It should also be appreciated that an audible tone or visual indication may be provided when the tension in the belt webbing 24 is increased above a predetermined level. It should further be appreciated that the projections 34 and 50 cooperate with the belt webbing 24 to prevent the belt webbing 24 from being worn by the housing 26. It should still further be appreciated that the pass through seat restraint tension sensing assembly 10 allows for ease of serviceability of the seat belt or sensor component.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A pass through seat restraint tension sensing assembly for a seat restraint system in a vehicle comprising:
   a housing for allowing belt webbing of the seat restraint system to pass therethrough;
   a plurality of sprints disposed in said housing;
   at least one magnet disposed in said housing;
   a Hall effect sensor disposed in said housing and cooperable with said at least one magnet; and
   a movable actuator disposed in said housing and cooperable with the belt webbing and said springs, said springs being arranged in an offset pattern to prevent tipping of said actuator, whereby said actuator moves as said springs are deflected to move said at least one magnet relative to said Hall effect sensor to indicate a tension level in the seat restraint system.

2. A pass through seat restraint tension sensing assembly as set forth in claim 1 wherein at least one of said springs is located longitudinally on one side of said actuator and at least another one of said springs is located longitudinally on the other side of said actuator.

3. A pass through seat restraint tension sensing assembly as set-forth in claim 2 wherein said at least one of said springs is located-longitudinally one half a distance of said at least another of said springs from a center axis of said actuator.

4. A pass through seat restraint tension sensing assembly as set forth in claim 1 wherein said springs are either one of a leaf spring and coil spring tuned to a predetermined force.

5. A pass through seat restraint tension sensing assembly as set forth in claim 1 wherein said housing has a cavity.

6. A pass through seat restraint tension sensing assembly as set forth in claim 5 including a plurality of magnets mounted on said actuator and disposed laterally with said Hall effect sensor therebetween.

7. A pass through seat restraint tension sensing assembly as set forth in claim 5 wherein said actuator extends laterally and is disposed in said cavity and has an arcuate upper surface adapted to engage the belt webbing.

8. A pass through seat restraint tension sensing assembly as set forth in claim 1 wherein said housing comprises an upper housing member and a lower housing member.

9. A pass through seat restraint tension sensing assembly as set forth in claim 8 wherein each of said upper housing member and said lower housing member has a projection extending laterally at each longitudinal end adapted to engage the belt webbing.

10. A pass through seat restraint tension sensing assembly as set forth in claim 8 including fasteners for securing said upper housing member and said lower housing member together.

11. A pass through seat restraint tension sensing assembly for a seat restraint system in a vehicle comprising:
   an upper housing member and a lower housing member cooperating with said upper housing member for allowing belt webbing of the seat restraint system to pass therethrough;
   a plurality of springs mounted on said lower housing member;
   at least one magnet mounted on said lower housing member;
   a Hall effect sensor mounted on said lower housing member and cooperable with said at least one magnet; and
   a movable actuator mounted on said lower housing member and cooperable with the belt webbing and said springs, being arranged in an offset pattern to prevent tipping of said actuator, whereby said actuator moves as said springs are deflected to move said at least one magnet relative to said Hall effect sensor to indicate a tension level in the seat restraint system.

12. A pass through seat restraint tension sensing assembly as set forth in claim 11 wherein said springs are either one of a leaf spring and coil spring.

13. A pass through seat restraint tension sensing assembly as set forth in claim 11 wherein at least one of said springs is located longitudinally on one side of said actuator and at least another one of said springs is located longitudinally on the other side of said actuator.

14. A pass through seat restraint tension sensing assembly as set forth in claim 11 wherein said at least one of said springs is located longitudinally one half a distance of said at least another of said springs from a center axis of said actuator.

15. A pass through seat restraint tension sensing assembly as set forth in claim 11 wherein said lower housing member has a cavity.

16. A pass through seat restraint tension sensing assembly as set forth in claim 15 including a plurality of magnets mounted on actuator and spaced laterally with said Hall effect sensor therebetween.

17. A pass through seat restraint tension sensing assembly as set forth in claim 15 wherein said actuator extends laterally and is disposed in said cavity and has an arcuate upper surface adapted to engage the belt webbing.

18. A seat restraint system for a vehicle comprising:
a seat restraint webbing;
a housing for allowing said seat restraint webbing to pass therethrough;
a plurality of springs disposed in said housing; and
a plurality of magnets disposed in said housing;
a Hall effect sensor disposed in said housing and cooperable with said magnets; and
a movable actuator disposed in said housing and cooperable with said seat restraint webbing and said springs, said springs being arranged in an offset pattern to prevent tipping of said actuator, whereby said actuator moves as said springs are deflected to move said magnets relative to said Hall effect sensor to indicate a tension level in the seat restraint system.

* * * * *